United States Patent [19]
Heidorn

[11] 3,789,965
[45] Feb. 5, 1974

[54] VACUUM CLUTCH ACTUATOR
[75] Inventor: John H. Heidorn, Dayton, Ohio
[73] Assignee: General Motors Corporation, Detroit, Mich.
[22] Filed: June 21, 1972
[21] Appl. No.: 264,882

[52] U.S. Cl. ............ 192/85 V, 192/77, 192/85 AT, 192/54
[51] Int. Cl. .......................................... F16d 25/00
[58] Field of Search.. 192/85 V, 85 AT, 82 T, 88 B, 192/76, 77

[56] References Cited
UNITED STATES PATENTS

| | | | |
|---|---|---|---|
| 1,913,268 | 6/1933 | Loach | 192/85 AT |
| 2,246,979 | 6/1941 | Kraft et al. | 192/88 B X |
| 2,284,193 | 5/1942 | Freer | 192/76 X |
| 2,811,956 | 11/1957 | Lauck | 192/82 T |
| 3,189,151 | 6/1965 | Sullivan | 192/85 V |
| 2,281,932 | 5/1942 | Freer | 192/85 AT X |

Primary Examiner—Benjamin W. Wyche
Attorney, Agent, or Firm—Charles R. Engle

[57] ABSTRACT

A vacuum clutch actuating mechanism including a member responsive to vacuum encircling a driven shaft and defining a closed space. One wall of the member is flexible and moves in response to vacuum supplied to the closed space. A leaf spring is attached to the moving wall and extends radially outwardly to engage a driven member mounted for radially outward movement and engage a driving member when the vacuum is supplied to the closed space moving the flexible wall. A two way overrunning clutch can be provided between the outer periphery of the driven member and an inwardly facing peripheral surface of the driving member. The radially outward movement of the spring is sufficient to initially lock up the overrunning clutch when the flexible wall moves in response to vacuum.

3 Claims, 6 Drawing Figures

PATENTED FEB 5 1974

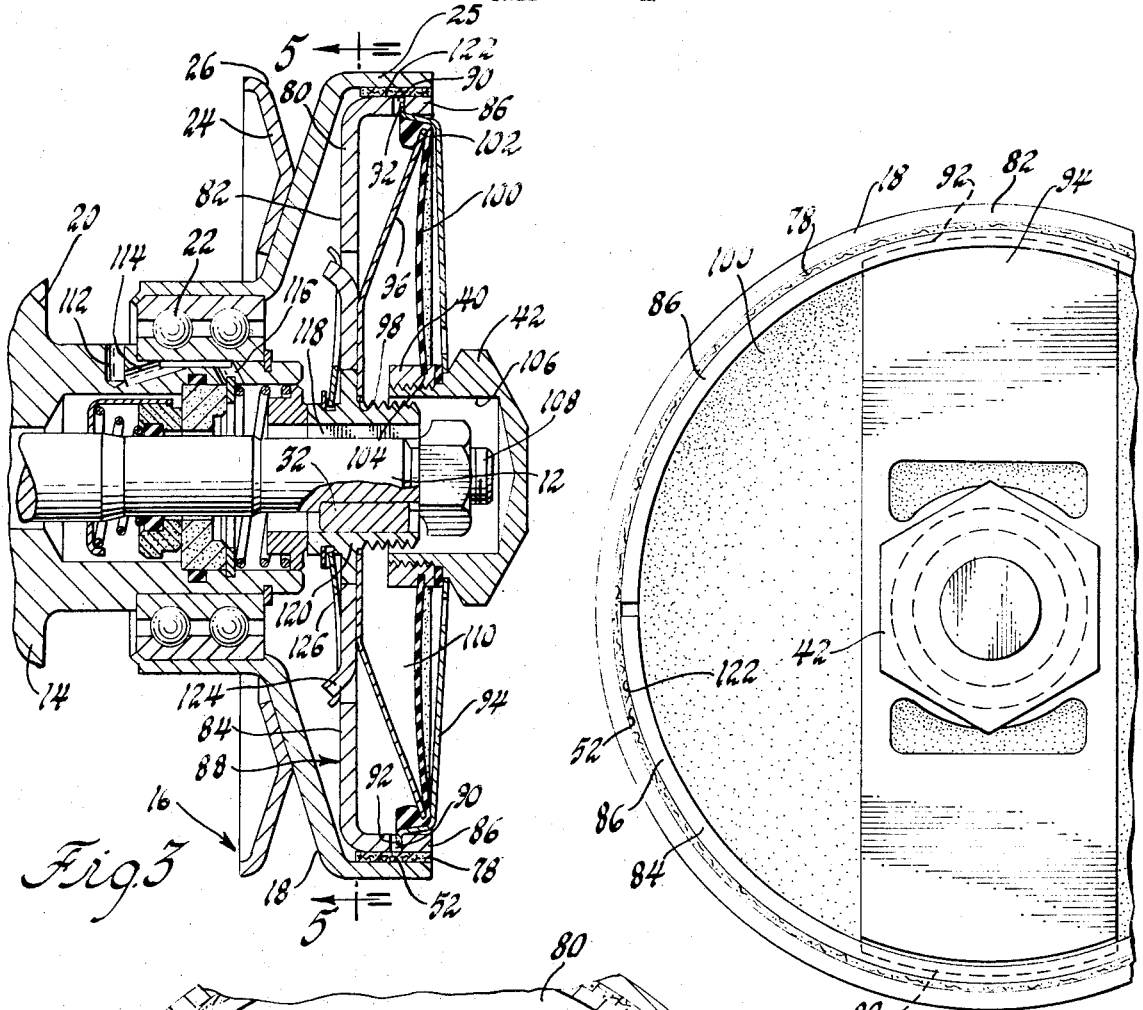
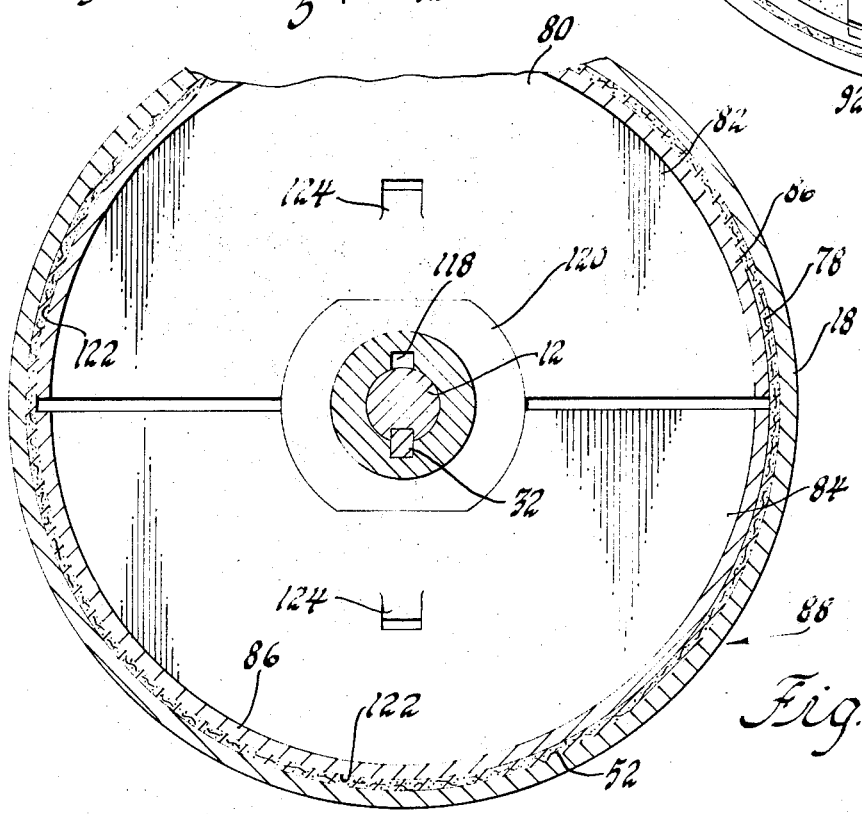

VACUUM CLUTCH ACTUATOR

This invention relates to a vacuum clutch actuating device and more particularly to the coupling of a continuously driven pulley with a selectively driven shaft such as that presently used in a vehicle air conditioning compressor assembly.

Clutch assemblies as presently known in the art usually involve a complicated structure for selectively energizing a clutch to couple driving and driven members. The subject invention has particular application in a vehicle air conditioning system wherein a pulley is continuously driven by the vehicle engine and is selectively connected to drive the air conditioning compressor. Engine vacuum is utilized to provide the energy required to accomplish actuation of the clutch assembly. The clutch actuating assembly includes a diaphragm or like member responsive to the vacuum when selectively supplied thereagainst from the internal combustion engine. In a preferred embodiment the diaphragm comprises a plate of thin sheet metal so that the vacuum is effective to snap the plate axially providing an "oil can" type of action. In other words, the thin sheet metal diaphragm responds to the vacuum on one side thereof and flexes in that direction causing its central portion to move axially in the same manner as the bottom of an oil can moves when actuated to dispense oil. The axial movement of the diaphragm moves a leaf spring which is configured to move radially as a result of the axial movement, thereby forcing segments of a diametrically split disk outwardly into engagement with the inner periphery of a continuously driven pulley member. It is only necessary that the disk be formed into at least two portions so that it can be moved radially outwardly by the leaf spring during the axial movement of the diaphragm to positively engage friction material placed around its outer periphery with the inner surface of the continuously driven pulley.

A general object of the subject invention is the provision of a relatively simple clutch actuating device utilizing a control source of vacuum to effect actuation of a clutch assembly.

Another object of the subject invention is the provision of a relatively simple clutch actuating device utilizing a control source of vacuum to effect actuation of a clutch assembly.

Another object of the subject invention is the provision of a vacuum responsive member effective to expand segments of a disk radially outwardly into engagement with a peripheral surface of a continuously driven member, thereby providing a coupled connection between driving and driven members.

Another object of the subject invention is the provision of a vacuum responsive member actuating a clutch engaging member to initially energize a one-way clutch assembly whereby further relative rotation between the driving and driven members further engage the one-way clutch positively coupling the members together.

A still further object of the subject invention is the provision of vacuum actuated diaphragm selectively movable to expand a leaf spring member so as to radially move segments of a disk outwardly into engagement with the periphery of a driving member, thereby coupling the driving member to the driven member as desired.

A more complete understanding of the present invention may be had from the following detailed description which should be taken in conjunction with the drawings in which:

FIG. 3 is a cross-sectional view illustrating a further modification of the subject invention in association with a vehicle air conditioning compressor.

FIG. 4 is an end plan view of the structure shown in FIG. 3.

FIG. 5 is a cross-sectional view taken on line 5—5 of FIG. 3.

Figure 1:
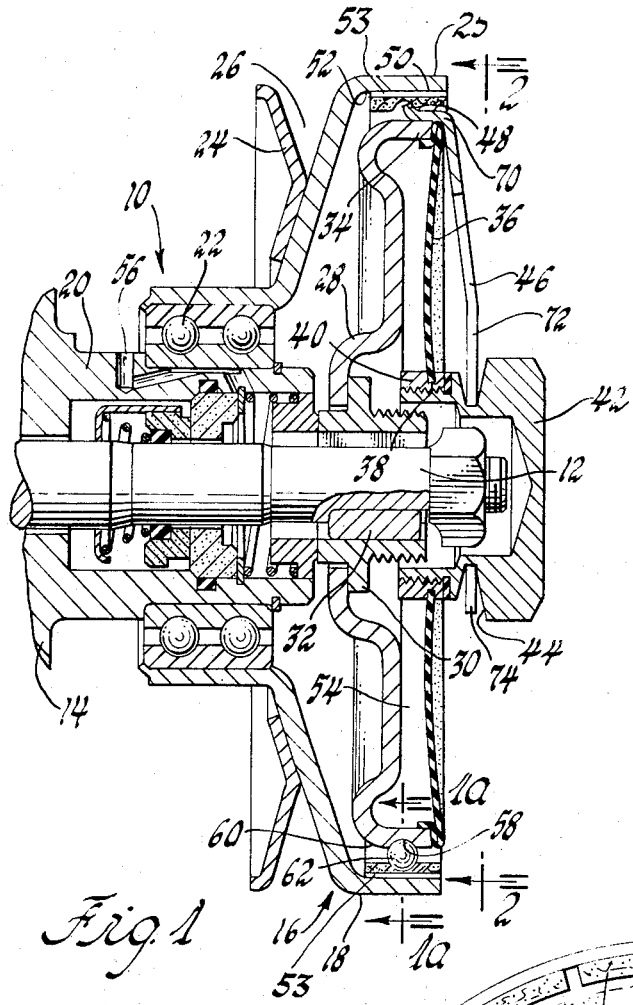
FIG. 1 is a cross-sectional view of one embodiment of the subject invention illustrated in association with a vehicle air conditioning compressor.

Referring now to the drawings, an embodiment of the clutch assembly 10 is shown in cross-section in association with a driven compressor shaft 12 extending exteriorly from the compressor assembly 14, a portion of which is shown for purposes of illustration only.

As shown in FIG. 1 a driving pulley assembly 16 is shown having a body portion 18 rotatably supported upon a compressor housing portion 20 by means of a ball bearing assembly 22. The pulley body portion 18 has a ring 24 welded thereon to form a V slot 26 receiving a driving belt for continuous rotation of the pulley assembly 16 by a vehicle engine. The pulley body portion 18 also includes an axially extending cylindrical flange 25. A driven clutch housing member 28 is welded or otherwise secured to a hub 30 that is in turn secured to the shaft 12 by a key 32 as shown. The clutch housing member 28 is formed to terminate in an axially extending annular flange 34. A diaphragm 36, constructed of thin metal or as shown an appropriate non-metallic flexible material, has its outer periphery secured to the annular flange 34 of the clutch housing 28 and contains an aperture 38 receiving a threaded grommet 40 which in turn threadably mounts a flanged bushing 42. The bushing 42 contains a groove 44 receiving a leaf spring member 46. The leaf spring member 35 is configured to be bowed outwardly away from the diaphragm 36 and terminates in an end portion 48 supporting an annular friction pad 50 which is capable of being biased outwardly into engagement with the inner peripheral surface 52 of flange 25 on the pulley body portion 18. The friction pad 50 is freely mounted adjacent surface 52 as is indicated by the space 53 therebetween. The pad 50 is prestressed to contract and return to the position shown after being expanded to engage the surface 52 while the clutch is energized.

Figure 1A:
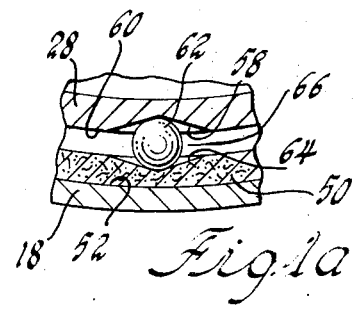
FIG. 1a is a fragmentary cross-sectional view taken on line 1a—1a of FIG. 1.

The diaphragm 36 and the clutch housing 28 cooperate to form a fluid tight cavity 54 which is in communication with a source of vacuum supplied by the vehicle engine through a passage 56 in the compressor housing portion 20. A control valve, not shown, regulates the application of the source of vacuum from the vehicle engine to the chamber 54 which is effective to engage the clutch in the following manner. Presence of a sufficient vacuum in fluid chamber 54 moves the diaphragm 36 to the left as viewed in FIG. 1, causing grommet 40 and bushing 42 to also move to the left, thereby flexing spring 46 causing it to expand radially outwardly moving the annular friction pad 50 into engagement with the inner peripheral surface 52 of pulley body portion 18. In this manner, the clutch is initially engaged creating a driving connection between the pulley assembly 16 and the shaft 12. A clutch assembly is incorporated into the structure by providing a plurality of ramp surfaces 58 in the outer peripheral surface 60 of the clutch housing 28 as shown in FIG. 1a. The initial engagement creating the driving connection between the pulley assembly 16 and the shaft 12 results in slight relative rotation between the clutch housing 28 and the pulley body portion 18 causing balls 62 to ride up the ramp surfaces of the clutch housing surface 60 thereby biasing the annular friction pad 60 outwardly into engagement with the inner peripheral surface 52 of the pulley assembly 16. The annular friction pad 50 likewise includes ramp surfaces 64 cooperating with the mating ramp surfaces 58 to form cavities 66, each receiving a ball 62 as shown in FIG. 1a. Further tendency of the pulley body portion 18 to rotate relative to the annular friction pad 50 results in further engagement of the friction pad with the inner peripheral surface 52 tightly engaging the pulley body portion 18 with the annular friction pad 50 positively connecting the pulley assembly 16 with shaft 12 through the clutch housing member 28 which is secured to the shaft by a key 32 shown in FIG. 1. In the non-engaged position, the pad 50 is prestressed to contract against the balls 62 in cavity 66 and frictionally retain them against the flange 34 of clutch housing 28 thereby preventing rattling of the clutch assembly.

Figure 2:
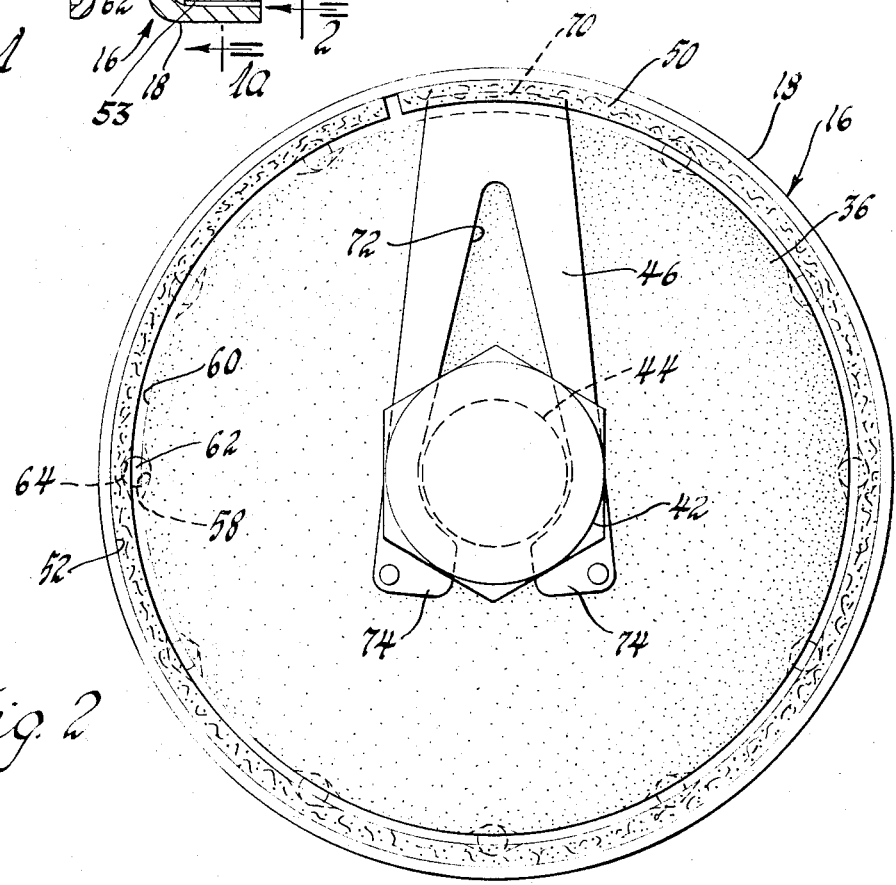
FIG. 2 is an end plan view looking in the direction as indicated by line 2—2 of the structure illustrated in FIG. 1.

With reference now to FIG. 2, the spring 46 can be in the form of a tapered leaf spring including a curved end portion 70 engaging the annular friction pad 50 and containing a V notch 72 terminating in lobe portions 74 retaining it upon the flanged bushing 42 as it snaps into a groove 44 best illustrated in FIG. 1. With this configuration, the lobe portions 74 can be spread apart for assembly upon the bushing 42 for receipt within the groove 44.

A further embodiment of the subject invention is shown in FIGS. 3 and 4 wherein like parts are given like reference numerals and specifically the pulley body portion 18 has an annular ring of friction material 78 adhered to its inner peripheral surface 52. A modified clutch housing member 80 includes semi-circular disks 82 and 84 each terminating in an annular axially extending flange 86, the disks cooperating to form a split cylindrical cap 88. The annular flanges 86 contain diametrically positioned apertures 90 receiving a bent portion 92 of a leaf spring assembly 94. A sheet metal plate 96 containing an aperture 98 is secured to the diametrically split clutch housing disks 82 and 84 and is formed to expand radially outwardly in close proximity to the leaf spring bent portions 92 as shown. A diaphragm 100 is secured to the outer periphery of the metal plate 96 forming a sealed rim 102, the diaphragm 100 containing an aperture 104 receiving and supporting a grommet 40, which in turn threadably receives a flanged bushing 42 in a manner similar to that described with reference to FIG. 1. The bushing 42 contains a cavity 106 receiving end 108 of the compressor shaft 12.

The diaphragm 100 and the sheet metal plate 96 cooperate to define a fluid tight chamber 110 which selectively receives vacuum from a controlled source through a passage 112 in the compressor housing 20, the vacuum being directed through connecting passages 114 and 116 for supply through a longitudinally extending passage 118 to the fluid tight chamber 110. The vacuum to the passage 112 is controlled by a valve assembly not shown.

Application of a vacuum having a predetermined magnitude to the fluid tight chamber 110 moves diaphragm 100 to the left as viewed in FIG. 3, thereby moving grommet 40 and bushing 42 axially to the left actuating spring 94 and expanding it radially outwardly against the diametrically split housing disk portions 82 and 84 likewise forcing them radially outwardly. The clutch housing disk portions 82 and 84 consequently move radially outwardly away from a hub portion 120 secured to shaft 12 which normally supports these members in an unactuated static position as shown in FIG. 5. The disk portions 82 and 84 engage an outer peripheral surface 122 thereof with the annular friction ring 78 drivingly connecting the shaft 12 with the pulley assembly 16. The housing disks 82 and 84 include struck portions 124 receiving leaf spring members 126 which also are attached to the hub 120. The springs 126 are effective to retract the clutch housing disks 82 and 84 back into engagement with the hub 120 when the vacuum is removed from the fluid tight chamber 110. The spring member 94 also has inherent characteristics such that removal of vacuum from the fluid tight chamber 110 allows it to move the bushing 42 and the grommet 40 to the right again returning the diaphragm 100 to its normal non-actuated position.

From the above description, which is intended for purposes of illustration only, it is apparent that this invention provides a simple and economically constructed vacuum actuated clutch assembly. The subject clutch assembly occupies a minimum of space in its operational environment while providing a positive driving connection. As previously stated, this invention has particular application in a vehicle air conditioning system wherein it is utilized to selectively connect a continuously driven pulley assembly with an air conditioning compressor shaft. The reason for its particular application in this environment is that the vehicle engine provides a ready source of vacuum for use in energizing the clutch assembly. Of course, the subject clutch structure could be used in any environment.

While I have shown and described specific embodiments of the present invention it will, of course, be understood that various modifications and alternative constructions may be made without departing from the true spirit and scope of this invention. For this reason I intend, therefore, by the appended claims to cover all such arrangements falling within the true spirit and scope of these claims.

I claim:

1. A vacuum actuated clutch effective to form a driving engagement in response to the application of vacuum from a source, said clutch comprising; an output shaft; a driving member rotatably mounted upon said shaft; a driven member secured to said shaft for rotation therewith; means defining a closed space adjacent said shaft; said means having axially flexible wall portions effective to collapse upon application of vacuum and move axially relative to said shaft; a friction member positioned between said driving member and said driven member; a lever member attached to said flexible wall portions of said means defining said closed space and extending to and supporting said friction member, said lever member moving axially with said flexible wall portions when they collapse in response to vacuum, said lever expanding said friction member outwardly into engagement with said driving member for rotation therewith; and overrunning clutch means engaged by rotation of said friction member relative to said driven member thereby coupling said driven member with said driving member as said overrunning clutch locks up due to the relative rotation between said driving member and said friction member relative to said driven member.

2. A vacuum actuated clutch effective to form a driving engagement in response to the application of vacuum from a source, said clutch comprising; an output shaft; a driving member mounted on said shaft for rotation relative thereto; a driven member secured to said shaft for rotation therewith; means defining a closed space encircling said shaft; said means having axially flexible wall portions effective to collapse upon application of vacuum and move axially relative to said shaft; an inwardly facing surface on said driving member; a cylindrical friction member positioned between said driving and driven members; a lever member attached to said flexible wall portions of said means defining said closed space, said lever member extending outwardly into engagement with said friction member, said lever moving axially with said flexible wall portions when they collapse in response to vacuum; a two-way clutch assembly positioned peripherally between said driven member and said driving member, said lever being operative to expand said friction member into frictional engagement with said driving member inwardly facing surface initially causing rotation of said driving member and said friction member relative to said driven member whereby said two-way clutch assembly locks up and connects the driven member with the driving member for continual rotation therewith while the vacuum clutch assembly is energized.

3. A vacuum actuated clutch effective to form a driving engagement in response to the application of vacuum from a source, said clutch comprising; an output shaft; a driving member including a cylindrical flange and rotatably mounted upon said shaft; a friction member secured to the inner circumferential surface of said flange; a driven member mounted upon said shaft for rotation therewith; said driven member being in the form of a cylindrical cap including an axially extending peripheral flange and being diametrically split into divided portions for radial expansion thereof; a flanged bushing secured to said flexible wall portions; a spring lever member attached to said flanged bushing and extending to and being attached to the divided portions of said diametrically split cap at said peripheral flange; said bushing and said spring lever member moving axially with said flexible wall portions when they collapse in response to vacuum, the axial movement of said spring lever expanding it radially moving the divided portions of said diametrically split cap radially outwardly engaging said cap peripheral flange with said friction member drivingly connecting said driving member with said driven member.

* * * * *